Figure 1:
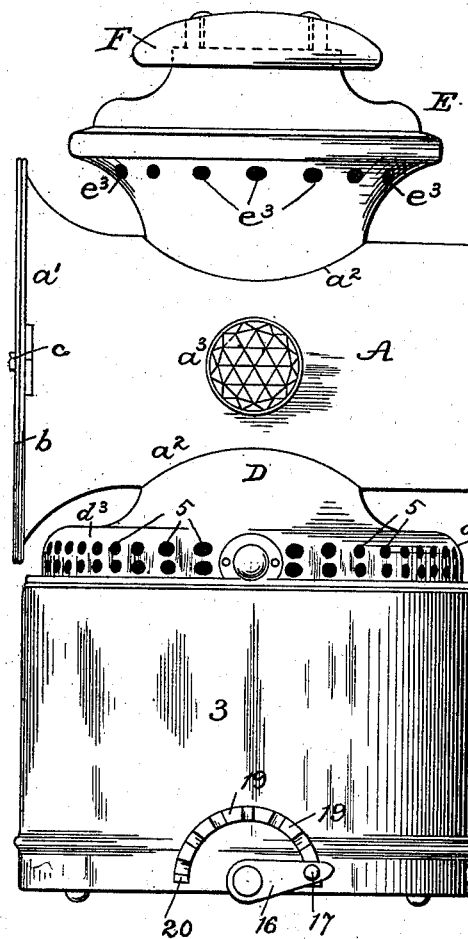

No. 669,872. Patented Mar. 12, 1901.
C. C. ARMSTRONG.
ACETYLENE GAS LAMP.
(Application filed Nov. 15, 1899.)

(No Model.) 3 Sheets—Sheet 1.

WITNESSES:
J. Emory Light
Josephine St. Adlin

INVENTOR:
Chas. C. Armstrong,
BY
Frank M. Burnham
his ATTORNEY.

THE NORRIS PETERS CO., PHOTO-LITHO., WASHINGTON, D. C.

No. 669,872. Patented Mar. 12, 1901.
C. C. ARMSTRONG.
ACETYLENE GAS LAMP.
(Application filed Nov. 15, 1899.)
(No Model.) 3 Sheets—Sheet 2.
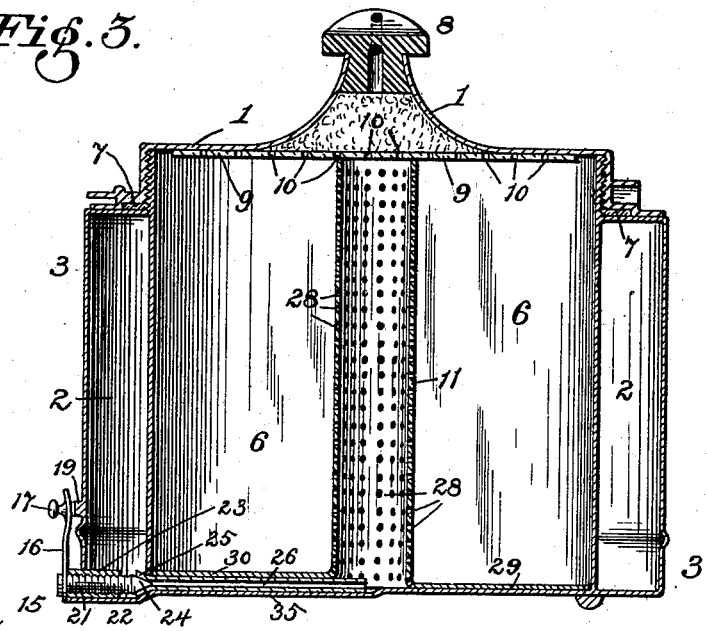
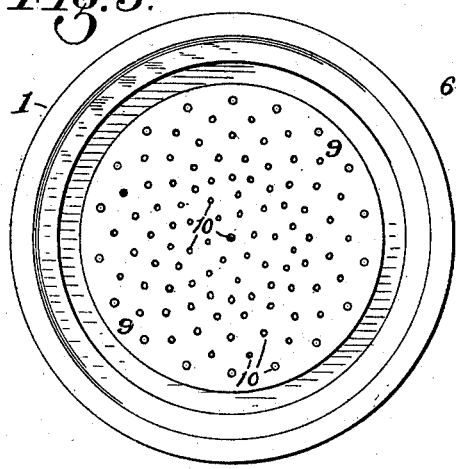
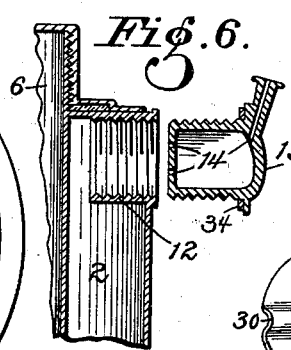
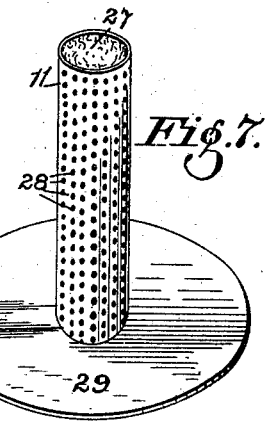
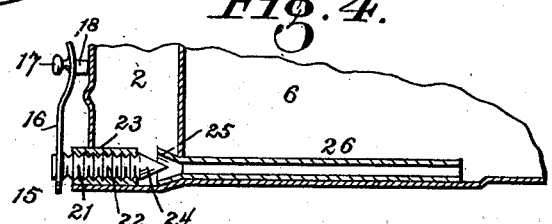
WITNESSES: INVENTOR:
J. Emory Light. Chas. C. Armstrong,
Josephine H. Adlin. BY Frank M. Burnham
his ATTORNEY.
THE NORRIS PETERS CO., PHOTO-LITHO., WASHINGTON, D. C.

No. 669,872. Patented Mar. 12, 1901.
C. C. ARMSTRONG.
ACETYLENE GAS LAMP.
(Application filed Nov. 15, 1899.)
(No Model.) 3 Sheets—Sheet 3.
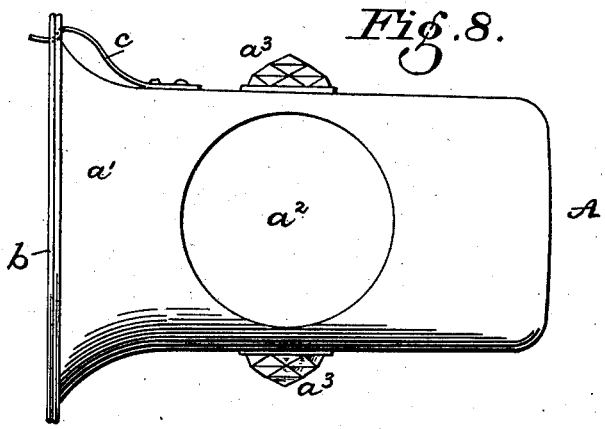
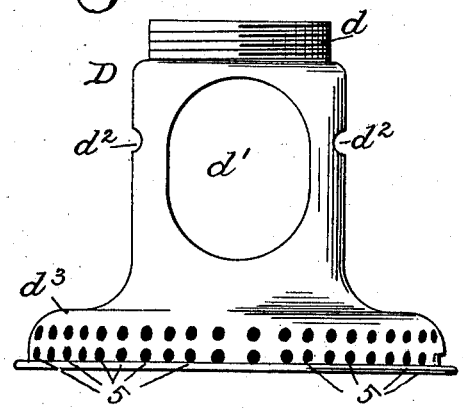
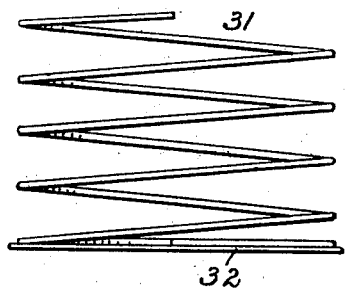
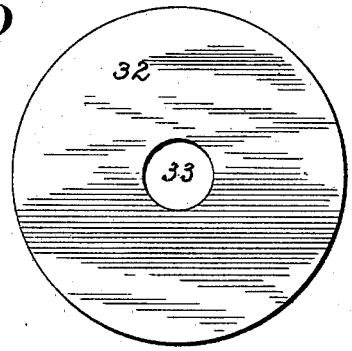
WITNESSES:
S. Emory Light
Josephine N. Odlin
INVENTOR:
Chas. C. Armstrong,
BY Frank M. Burnham
his ATTORNEY.

UNITED STATES PATENT OFFICE.

CHARLES CARROLL ARMSTRONG, OF COLUMBUS, OHIO.

ACETYLENE-GAS LAMP.

SPECIFICATION forming part of Letters Patent No. 669,872, dated March 12, 1901.

Application filed November 15, 1899. Serial No. 737,082. (No model.)

*To all whom it may concern:*

Be it known that I, CHARLES CARROLL ARMSTRONG, a citizen of the United States, residing at Columbus, in the county of Franklin and State of Ohio, have invented certain new and useful Improvements in Acetylene-Gas Lamps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My present invention relates to improvements in the construction of acetylene-gas lamps intended to be used mostly for outdoor purposes and which are designed more especially for bicycles, cars, carriages, &c.; and it consists more directly in certain new and peculiar features of construction and arrangement of the parts of the gas generator or attachment and its combination with the other parts of the lamp, as will be more fully described hereinafter, and pointed out in the subjoined claims in accordance with the statutes in such cases made and provided for.

One of the principal objects of this invention is to provide a gas generator or attachment for lamps of the class above referred to which is susceptible of being used on my oil-lamp for which there was granted to me Letters Patent No. 614,315, bearing date of November 15, 1898. By the removal of the oil-fount and placing my improved gas generator or attachment in lieu thereof, thus changing said lamp into an acetylene-gas or an oil lamp *ad libitum*, and although used in combination with the upper portions of said oil-lamp it is of course a separate and distinct improvement over said oil-lamp.

Some of the many advantages sought and obtained in the construction of my improved acetylene-gas lamp consist in providing means for conveying or carrying and properly regulating the supply of water (no matter what may be the condition of said water, whether pure or impure) as fed to the calcium carbid, so as to always keep an even pressure of gas no matter in what conditions the lamp may be placed, in providing means for a proper vent or outlet passage for the air, means for properly filtering the gas as generated and on its passage to the burner, and by providing the above-referred-to means I prevent that objectionable hissing noise when riding over rough streets or roads so common in the present form of gas-lamps of this class now in use, wherein the gas is not properly generated or controlled and there is too great or not sufficient or an irregular pressure of gas; also by attaching my improved gas generator or attachment to and using it in combination with the upper portions of my lamp as constructed according to my said patent, No. 614,315, as above referred to, whereby means are provided for a more perfect ventilation, thus carrying off the great amount of heat produced by the use of calcium carbid, and means for steadying the flame by cool currents of air from the outside.

Figure 2:
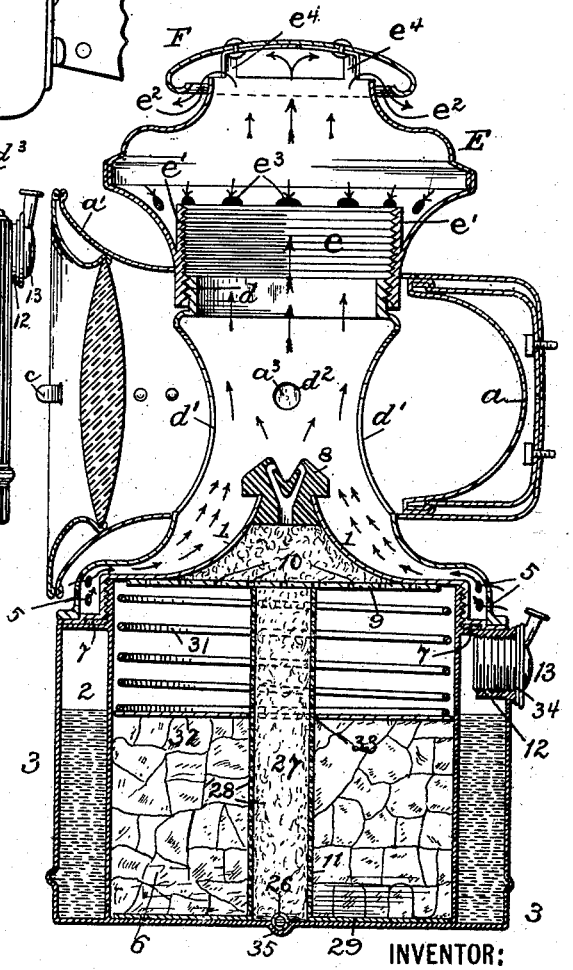

Referring to the accompanying drawings, illustrating my invention, and in which similar letters and numerals of reference refer to like parts throughout the several views, Figure 1 is a side elevation of my improved acetylene-gas lamp, and Fig. 2 is a vertical sectional view of same. Fig. 3 is a somewhat enlarged vertical sectional view through the gas-dome and gas generator or attachment, showing the cone or screw valve at bottom of water-chamber as closing the opening in the pipe or conduit which carries and supplies the water to the center of the gas or carbid chamber, thus cutting off the water-supply to the calcium carbid; also, the perforated gas tube or standard and its annular base-plate, said tube being shown without its filling. Fig. 4 is an enlarged vertical sectional view in detail of a portion of lower part of water chamber or compartment and gas generating and carbid chamber broken away and showing the cone or screw valve turned far enough forward so as to leave the opening clear at end of water-supply pipe or conduit for the water to flow through and feed the calcium carbid. Fig. 5 is a bottom or inverted plan view of the gas dome or top, showing the rubber disk and its perforations, through which the gas passes to and is filtered by the cotton. Fig. 6 is an enlarged sectional view in detail of a portion of the upper part of gas and water chambers, taken through the water-filler and showing filler-cap removed and the construction and location of the vent or air passages therein. Fig. 7 is a perspective view of perforated gas-tube, formed at its base in an annular flange or plate and showing in said tube the cotton filling which filters the gas. Fig. 8 is a plan view of main body of lamp. Fig. 9 is a side elevation of the chimney from front or lens side. Fig. 10 is a side view of coil-spring and its annular base-plate for retaining the calcium carbid in position; and Fig. 11 is a bottom plan view of same, showing opening in said base-plate, which fits over and around the gas-tube.

In describing my invention in detail, and having reference to the various parts by means of the aforesaid letters and numerals of reference as employed in the several views of the drawings, A is the main body, which is supported by means of any ordinary and well-known form of hanger and in any suitable manner, said main body being provided on the inside of its rear end with a reflector $a$, while its forward end $a'$ is preferably bell-shaped, so as to receive the lens and frame $b$, hinged thereto at one side, while the opposite side is provided with a spring-catch $c$. Main body A is further provided with central openings $a^2$, through which fits and passes chimney D. The upper end $d$ of chimney D is externally screw-threaded to receive the internally-screw-threaded end $e$ of chimney-head E, which is formed integral therewith and extends inside thereof in a vertical or upward annular flange, which forms a wind-guard $e'$ for the purpose of preventing any outside current of cool air, which might be caused by a sudden gust of wind coming through the perforated openings $e^3$, from forcing or driving back the heated air or products of combustion which arise from the flame in their passage or egress through annular outlet or opening $e^2$ between cap F and top of head E and the numerous perforated openings $e^3$, arranged in and around lower portion of said head. Cap F is supported and attached to chimney-head E by means of small legs $e^4$, riveted thereto. It will be here observed that the upper portion of chimney D passes entirely up through the main body A of the lamp, thus helping to condense or confine the current of heated air and products of combustion in their passage to the annular outlet and perforated openings in the top of chimney-head E, as above described. Two openings $d'$, preferably slightly elliptical in form, are located one in opposite sides of said chimney for the purpose of allowing reflector $a$ to throw the light out through the lens. Two small openings $d^2$ are also located in said chimney directly opposite to each other, so that when said chimney is in position these openings will register in a direct line with the two side lights $a^3$ in the main body A and will receive the direct rays of light from the flame. The lower end of chimney D is formed in a depending annular flange $d^3$, so as to fit over and around the gas dome or top 1 and rest on the top of water-chamber 2 of the gas generator or attachment 3, and is detachably held or retained in position by any well-known and ordinary form of spring catch or snap or other suitable connecting device, (not necessary to be here shown or described,) thus connecting the gas attachment with the upper portion of the lamp. Numerous perforated openings 5 are formed all around said flange $d^3$ for the purpose of furnishing an inlet for a constant supply of small currents of cool air, thus steadying the flame and assisting in driving or forcing the heated air and products of combustion in their upward course to their final outlet or points of egress, as indicated and shown by the arrows. (See Fig. 2.) Said currents of cool air further answer the purpose of moderating the great amount of heat produced by the use of calcium carbid.

My improved gas attachment 3 is subdivided into two compartments or chambers—viz., a water-chamber 2 and a gas-generating chamber 6, (see Figs. 2 and 3,) said gas-chamber being the receptacle for the carbid from which the gas is generated, as will be more fully described hereinafter. The bottom of said gas-chamber is suitably formed, as at 35, to receive water-supply pipe 26, and said bottom may be further provided with short feet or supporting-projections, (see Figs. 1 and 3,) if desired. A gasket 7, of rubber or like suitable material, is placed over and around the externally-screw-threaded top of the gas or carbid chamber and rests upon the top of water-chamber 2, (see Figs. 2 and 3,) and as the gas dome or top 1 is drawn down it presses tightly upon said gasket by reason of its internal screw-threads engaging the external screw-threads surrounding the top of said gas-generating chamber, thus making a gas and air tight joint. A lava tip or burner 8, of any suitable and well-known form, having proper openings for the flame, is securely located in the top or dome 1. Covering over the concaved bottom of top or gas-dome 1 and resting over the gas-chamber I cement or otherwise securely attach a flat rubber disk 9, formed with numerous perforations 10, and in the concaved chamber or recess left between said disk and lava burner I place a sufficient quantity of cotton or other like suitable filtering material, so that as the gas passes up through gas-tube 11 and around it said gas in seeking an outlet will pass upward and through the perforations 10 in said rubber disk, thence through the cotton and be thoroughly and properly filtered, and thence through the passages in lava burner 8 and feed the flame. As hereinbefore set forth, the tube 11 forms not only the water-inlet and distributer to the generating-chamber, but also forms the outlet for the gas from said chamber. This is due to the fact that the carbid is located between two plates having a relative movement toward each other, said plates substantially fitting the inner faces of the walls of the chamber, which in itself by reason of this construction is one having a variable internal capacity. It will therefore be seen that the passage of the gas will be mainly through the perforations of the tube 11 and thence through the absorbent filling to the burner. As the filling will be kept substantially moist by capillary feed of the water introduced through the water-feed, the gas will be forced through a filtering medium, which also serves the purpose of keeping the gas cool during its passage.

At top of water-compartment 2, which surrounds the gas-generating chamber 6, I provide a water-filler 12, formed with internal screw-threads adapted to engage the external screw-threads on end of a removable cap 13. (See Figs. 6 and 2.) Said filler-cap is provided with rubber washer 34, thus making an air-tight joint and formed into a vent by air-passages 14, which permit of the entrance of air to the water-chamber when filled and being gradually used in the generation of gas, thus permitting of the constant action or flow of the water after it is let into water-chamber 2 through the opening in filler 12 to the screw or cone valve 15 located at bottom of said water-compartment. Cone-valve 15 is provided at its outer end with a spring-arm 16, said spring-arm being formed at its end in a short handle or knob 17 and a lug or pawl 18, said projecting lug being adapted to engage and rest between the corrugations or teeth 19 in semicircular rack-bar 20, located at bottom and on outside of said water-compartment, and by the operation of said spring-arm when turned and the external screw-threads 21 on shank 22 of said cone-valve engaging the internal screw-threads of short sleeve or pipe 23 the cone-shaped head 24 of said shank will be brought in a position to open or close the mouth 25 (which is of similar contour to head 24) of water pipe or conduit 26, so as to shut off the supply of water either partially or fully as desired. (See Figs. 3 and 4.) When mouth 25 of said water-supply pipe is opened, as just described, the water in said water-compartment by reason of its own action and the law of gravitation will flow through pipe 26 and pass into perforated gas-tube 11 and be fed to the calcium carbid (which is first placed in the gas-generating chamber) through the small perforations 28 formed in said gas tube or standard, and gas will be thus generated, a portion of which will pass up through said gas-tube and be filtered by the filtering material 27, thence upward through openings 10 in disk 9, thence through the cotton or like filtering material in concaved recess in gas-dome 1 to the burner, where it will be consumed by and supply the flame, as heretofore described. The rest of the gas as generated will also in like manner pass up through said openings in the disk at top of gas-chamber to the flame, as heretofore described. It will be understood, of course, that the tube 26 is substantially filled with water at all times during the generation of gas owing to the fact that it is taken therefrom by capillary action of the absorbent filling 27. Hence there is formed a seal against the passage of gas from the lower end of the tube compelling the passage of the gas toward the opposite end of said tube.

Gas tube or standard 11 is formed at its base in an annular supporting flange or plate 29, approximately the same circumference as the gas generating or carbid chamber, so as to readily slip in and out of said gas-chamber when desired for the purpose of removing the carbid when the gas has all been taken from it, said flange being formed with a boss or raised portion 30, so as to rest firmly on the bottom of said gas-generating chamber over water-supply pipe or conduit 26, and thus permit of the water being fed up through the bottom opening of said gas-tube and perforations 28 and be absorbed by the carbid. For the purpose of retaining the carbid in a compact and stationary position in its chamber, even when it swells from decomposition, I employ a coil-spring 31, provided with an annular base-plate 32, having a central opening 33, which fits over and around and is held in position by gas-tube 11, said base-plate 32 being approximately the same circumference as the carbid-chamber, so as to slip or move upward in said chamber when the carbid swells after decomposition, said plate being held down upon the calcium carbid, as shown in Fig. 2, by reason of top of its coil-spring 31 bearing up against disk 9 at top of gas-generating chamber. It will be here observed and of course readily understood that by employing said perforated gas-tube provided with an annular flange or base, as above described, the water coming underneath said flange comes in contact with the carbid around the edges of said flange, and also through the central opening or end of gas-tube, and is distributed or passes through the perforations to the carbid. Said cotton filling not alone prevents the carbid from falling into perforated gas-tube through its perforations, and thus clogging up and shutting off the main outlet for the gas, but it also acts at the same time as a filterer for the gas, thus serving a twofold purpose. By my method of feeding the water to the carbid from the bottom of the chamber by means as above described instead of the usual dripping of the water on the carbid from above the coating over of the top of the carbid, thus preventing the shutting off of the outlet for the escape of the gas, is avoided. By placing the valve in the water-chamber it is impossible for it to ever become inoperative by reason of its becoming choked or clogged up, as it never comes in contact with the carbid.

It will be readily understood that by providing means as herein described for the proper control and regulation of the pressure of the gas there will never be any danger of an explosion and all hissing noise caused by too great or uneven pressure of gas will be avoided.

Having thus described my improved acetylene-gas lamp, what I claim as new and as my invention, and desire to secure by Letters Patent, is—

1. In an acetylene-gas lamp, the combination of a generating-chamber; a combined water-inlet and gas-outlet perforated tube located within said chamber; an imperforate plate slidably mounted on said tube and forming a movable wall for said chamber; a stationary perforated plate extending across the upper end of said chamber and said tube; a spring interposed between said movable wall and said perforated plate, whereby said wall will be held in close contact with the surface of the carbid; a burner located above said perforated plate; filtering means located within said tube; a water-receptacle; and a controllable water-feed for delivering water to the lower end of said tube, the water-inlet to said tube forming an automatic seal against the passage of gas from said lower end, substantially as described.

2. In an acetylene-gas lamp, the combination of a generating-chamber; a combined water-inlet and gas-outlet perforated tube located within said chamber; an imperforate plate slidably mounted on said tube and forming a movable wall for said chamber; a stationary perforated plate extending across the upper end of said chamber and said tube; a spring interposed between said movable wall and said perforated plate, whereby said wall will be held in close contact with the surface of the carbid; a burner located above said perforated plate; filtering means located within said tube; a water-receptacle surrounding the side walls of said chamber; and a controllable water-feed leading from the lower end of said receptacle to the lower end of said tube, the water-inlet to said tube forming an automatic seal against the passage of gas from said lower end, substantially as described.

3. In an acetylene-gas generator, a perforated tube having a flanged base-plate; a raised portion formed on said base-plate; means for introducing liquid to said tube, said means extending beneath said raised portion; and a filling within said tube adapted to protect the perforated portion, substantially as described.

4. In an acetylene-gas lamp, the combination of a gas generator or attachment comprising a separate gas or carbid compartment and a water-chamber; a water filler and vent connected to said water-chamber; and a ratchet or rack attached to said water-chamber; a valve located within said water-chamber and comprising a screw-threaded shank which engages and moves in a screw-threaded sleeve, an arm on one end of said shank adapted to engage the teeth of said ratchet or rack, a cone-shaped head on other end of said shank; a water-supply pipe or conduit having one end so formed as to receive said cone-shaped head of shank; and a combined water-inlet and gas-outlet tube or standard provided with perforations in its entire length and formed with a flanged base-plate provided with a raised portion adapted to fit over the water-tube; substantially as described.

5. In an acetylene-gas lamp, the combination of a gas generator or attachment comprising a separate gas or carbid compartment and a water-chamber; a water filler and vent, and a ratchet connected to said water-chamber; a water-valve so located as to be impossible for the carbid to come in contact with it, and comprising a screw-threaded shank which engages and moves in the screw-threaded sleeve, an arm on one end of said shank adapted to engage the teeth of said ratchet or rack, a cone-shaped head on other end of said shank; a water-supply pipe or conduit having an end formed to receive said cone-shaped head of said shank; a perforated combined water-inlet and gas-outlet tube having a filling of suitable filtering material and formed with a flanged base-plate provided with a raised portion adapted to fit over the water-tube; a retaining-spring and base-plate, substantially as described.

6. In an acetylene-gas lamp, the combination of a gas generator or attachment comprising a separate gas or carbid compartment and a water-chamber; a water filler and vent, and a ratchet connected to said water-chamber; a water-valve so located as to be impossible for the carbid to come in contact with it, and comprising a screw-threaded shank, which engages and moves in the screw-threaded sleeve, an arm on one end of said shank adapted to engage the teeth of said ratchet or rack, a cone-shaped head on other end of said shank; a water-supply pipe or conduit having a mouth formed to receive said cone-shaped head of said shank; a perforated water-inlet and gas-outlet tube formed with a flanged base-plate provided with a raised portion adapted to fit over the water-tube, a filtering material within said gas-tube; a retaining-spring and base-plate; a gas-dome comprising a bottom formed by a perforated disk, a concaved recess having a filling of suitable filtering material and a lava tip or burner; substantially as described.

In testimony whereof I have affixed my signature in presence of two witnesses.

CHARLES CARROLL ARMSTRONG.

Witnesses:
W. A. PAINTER,
EDW. B. THOMAS.